United States Patent
Shin et al.

(10) Patent No.: US 10,374,203 B2
(45) Date of Patent: Aug. 6, 2019

(54) HEAT-DIFFUSIBLE SEPARATION FILM AND SECONDARY CELL COMPRISING THE SAME

(71) Applicant: LG Chem, Ltd., Seoul (KR)

(72) Inventors: Hyun-Kyung Shin, Daejeon (KR); Min-Hyung Kim, Daejeon (KR); Dong-Wook Sung, Daejeon (KR); In-Hyouk Sung, Daejeon (KR); Ji-Eun Lee, Daejeon (KR); Joo-Sung Lee, Daejeon (KR)

(73) Assignee: LG Chem, Ltd. (KR)

( * ) Notice: Subject to any disclaimer, the term of this patent is extended or adjusted under 35 U.S.C. 154(b) by 32 days.

(21) Appl. No.: 15/539,408

(22) PCT Filed: Jan. 11, 2016

(86) PCT No.: PCT/KR2016/000247
§ 371 (c)(1),
(2) Date: Jun. 23, 2017

(87) PCT Pub. No.: WO2016/111606
PCT Pub. Date: Jul. 14, 2016

(65) Prior Publication Data
US 2017/0365829 A1    Dec. 21, 2017

(30) Foreign Application Priority Data

Jan. 9, 2015 (KR) .................. 10-2015-0003622

(51) Int. Cl.
*H01M 2/16* (2006.01)
*H01M 2/18* (2006.01)
(Continued)

(52) U.S. Cl.
CPC ............. *H01M 2/16* (2013.01); *H01M 2/162* (2013.01); *H01M 2/166* (2013.01);
(Continued)

(58) Field of Classification Search
CPC ...... H01M 2/16; H01M 2/1613; H01M 2/162; H01M 2/1646; H01M 2/1653;
(Continued)

(56) References Cited

U.S. PATENT DOCUMENTS

| | | | |
|---|---|---|---|
| 2012/0208070 A1* | 8/2012 | Nakashima | ......... H01M 2/1646 429/158 |
| 2013/0224555 A1 | 8/2013 | Hong et al. | |
| 2016/0043370 A1* | 2/2016 | Hatta | ................... H01M 2/145 307/10.1 |

FOREIGN PATENT DOCUMENTS

| | | |
|---|---|---|
| JP | 2006269358 A | 10/2006 |
| JP | 2010171030 A | 8/2010 |

(Continued)

OTHER PUBLICATIONS

Smalc, Martin et al., "Thermal Performance of Natural Graphite Heat Spreaders," Proceedings of IPACK 2005, ASME InterPACK '05, Jul. 2005, pp. 1-11.*

(Continued)

*Primary Examiner* — Brittany L Raymond
(74) *Attorney, Agent, or Firm* — Lerner, David, Littenberg, Krumholz & Mentlik, LLP

(57) ABSTRACT

The present disclosure provides a heat-diffusible separator including a separator, and a porous heat transfer film formed on at least one surface of the separator.

12 Claims, 1 Drawing Sheet

(51) Int. Cl.
  *H01M 10/653* (2014.01)
  *H01M 10/654* (2014.01)
  *H01M 10/613* (2014.01)

(52) U.S. Cl.
  CPC ....... *H01M 2/1613* (2013.01); *H01M 2/1646* (2013.01); *H01M 2/1653* (2013.01); *H01M 2/1666* (2013.01); *H01M 2/1686* (2013.01); *H01M 2/18* (2013.01); *H01M 10/613* (2015.04); *H01M 10/653* (2015.04); *H01M 10/654* (2015.04)

(58) Field of Classification Search
  CPC .. H01M 2/166; H01M 2/1666; H01M 2/1686; H01M 2/18; H01M 10/613; H01M 10/653; H01M 10/654
  See application file for complete search history.

(56) References Cited

FOREIGN PATENT DOCUMENTS

| | | |
|---|---|---|
| JP | 2013224258 A | 10/2013 |
| JP | 2014133669 A | 7/2014 |
| KR | 20100073753 A | 7/2010 |
| KR | 20130099592 A | 9/2013 |
| WO | WO 2014-148036 * | 9/2014 |

OTHER PUBLICATIONS

Search report from International Application No. PCT/KR2016/000247, dated Apr. 29, 2016.

Sharma et al., "Preparation of novel carbon microfiber/carbon nanofiber-dispersed polyvinyl alcohol-based nanocomposite matrial for lithium-ion electrolyte battery separator", Materials Science and Engineering C 33, Dec. 2012, pp. 1702-1709.

* cited by examiner

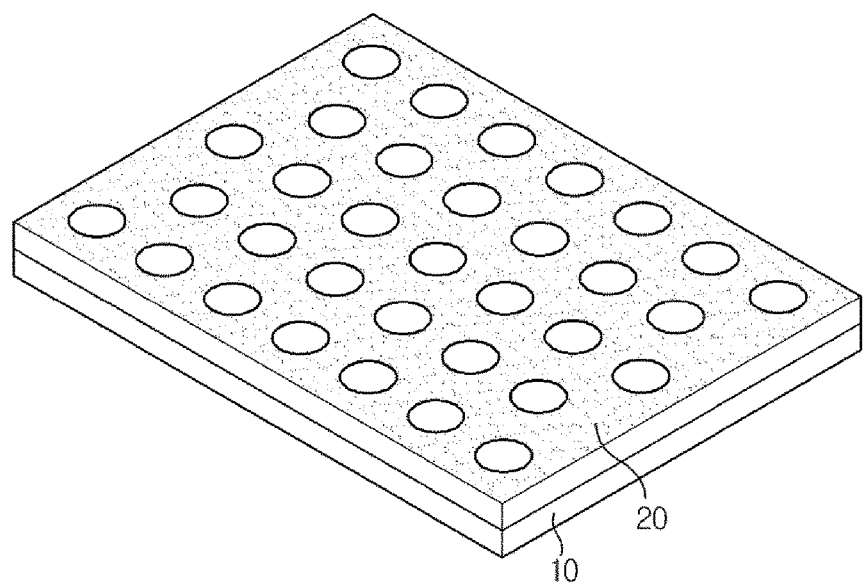

HEAT-DIFFUSIBLE SEPARATION FILM AND SECONDARY CELL COMPRISING THE SAME

CROSS-REFERENCE TO RELATED APPLICATIONS

The present application is a national phase entry under 35 U.S.C. § 371 of International Application No. PCT/KR2016/000247 filed Jan. 11, 2016, which claims priority from Korean Application No. 10-2015-0003622 filed Jan. 9, 2015, all of which are incorporated herein by reference.

The present application claims priority to Korean Patent Application No. 10-2015-0003622 filed on Jan. 9, 2015, the disclosure of which is incorporated herein by reference.

TECHNICAL FIELD

The present disclosure relates to a heat-diffusible separator and a secondary battery comprising the same, and more particularly, to a heat-diffusible separator capable of rapidly diffusing heats generated locally within a battery cell and a secondary battery comprising the same.

BACKGROUND ART

Recently, interest in energy storing technologies is gradually increasing. As the use of secondary battery expands into energies for a mobile phone, a camcorder, a laptop computer, and also to an electric vehicle, development of a chargeable and dischargeable secondary battery, or a lithium secondary battery in particular, is receiving increasing attentions.

Meanwhile, a porous separator of the secondary battery shows severe heat contraction behavior at a temperature of about 100° C. or above due to properties of the materials and characteristic of a fabricating process that involves elongation, thus resulting in a problem of short circuit generated between a positive electrode and a negative electrode.

The separator generally used in a lithium ion battery field may use a polyolefin-based material such as polyethylene or polypropylene, and has a thickness of about 25 μm.

Heat stability may be one of the issues raised with respect to development of the currently commercialized separator. The polymer resin separator starts to have heat contraction at a temperature of approximately 120 degrees. Specifically, a winding-type cylindrical/prismatic batteries have particularly greater deformation at a core portion where the stress is relatively weaker in T/D direction and thus are subject to possibilities that uncoated portions of the positive electrode and/or the negative electrode are contacted, heated, or ignited due to the separator contraction from exposure to a high temperature for a long time. In order to improve heat contraction of the separator, an inorganic-polymer resin composite may be prepared with a wet coating method. However, a thickness of the separator increases by more than several micrometers, causing deterioration of energy density of a battery cell in a limited space.

Further, when heats are locally generated and temperature rises to above certain degrees in the battery cell, the separator can be melt, thus causing short circuit between the positive electrode and the negative electrode, which in turn causes secondary heats to be generated, thus considerably deteriorating battery stability. Accordingly, constant demand is raised for a technology that can improve heat stability of the separator.

DISCLOSURE

Technical Problem

The present disclosure is designed to solve the problems of the related art, and therefore, the present disclosure is directed to providing a heat-diffusible separator which can rapidly diffuse heats generated locally on a separator by using a porous heat transfer film, and a secondary battery comprising the same.

The other objectives and advantages of the present disclosure can be understood with the following description and more clearly with the embodiments of the present disclosure. Also, it will be easily understood that the objects and advantages of the present disclosure may be realized by the means shown in the appended claims and mixtures thereof.

Technical Solution

In one aspect of the present disclosure, there is provided a heat-diffusible separator comprising a separator, and a porous heat transfer film formed on at least one surface of the separator.

The porous heat transfer film may have a greater value of heat conductivity in a surface direction than that of heat conductivity in a thickness direction.

Heat conductivity of the porous heat transfer film in a surface direction may be 20 times greater than heat conductivity in a thickness direction.

The porous heat transfer film may have an open cell type structure in which internal pores are present in a connected form with each other.

The porous heat transfer film may have a close cell type structure in which internal pores are present independently.

The porous heat transfer film may be formed of at least one selected from a group consisting of graphite, carbon nano-tube and carbon nano-fabric.

The separator may be formed of a porous polymer substrate individually, or may include the porous polymer substrate, and a porous coating layer formed on at least one surface of the porous polymer substrate.

The porous coating layer may be formed of inorganic particles, and binder polymer particles.

In another aspect of the present disclosure, there is also provided a secondary battery including the separator described above.

Advantageous Effects

The present disclosure provides a heat-diffusible separator having a porous heat transfer film adhered onto a surface of the separator, and thereby provides an advantage in which heats generated locally within a battery cell can be rapidly diffused.

Further, the present disclosure provides a web-like porous heat transfer film having an optimized form of pores, thereby maximizing heat-diffusion effects.

Further, the present disclosure provides a secondary battery including the separator described above, thus having enhanced battery stability and improved lifetime characteristic.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

FIG. 1 is a schematic perspective view of a heat-diffusible separator according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

FIG. 1 is a schematic perspective view of a heat-diffusible separator according to an embodiment of the present disclosure.

Referring to FIG. 1, the heat-diffusible separator according to an embodiment includes a separator 10, and a porous heat transfer film 20 formed on at least one surface of the separator 10.

Without limitation, the separator may be formed from any material that can be applied in a secondary battery to prevent short circuit between a negative electrode and a positive electrode, although a preferable example may be a porous polymer substrate, and more specifically, a porous polymer film or a non-woven fabric composed of polyolefin such as polyethylene or polypropylene. Also, such polyolefin porous polymer substrate exhibits a shutdown function at a temperature between 80° C. to 130° C., for example.

In an example, the polyolefin porous polymer substrate may be formed of polyolefin-based polymer, e.g., polyethylene such as high-density polyethylene, linear low-density polyethylene, low-density polyethylene, and ultra high molecular weight polyethylene, polypropylene, polybutylene, polypentene, either individually or as a mixture of two or more of these.

Further, the porous polymer substrate may be prepared in a shape of film or non-woven fabric, using various polymers such as polyester besides polyolefin. Further, the porous polymer substrate may be formed in a stack structure of two or more layers of films, and each layer of the film may be formed of polymer such as polyolefin, polyester, and so on as described above, either individually or as a mixture of two or more of these.

Further, besides polyolefin mentioned above, the porous polymer substrate, such as the porous polymer film and the porous nonwoven fabric, may be formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, and so on, either individually or as a mixture of these.

Further, although a thickness of the porous polymer substrate may not be limited particularly, it may be preferably from 5 μm to 50 μm. A size of a pore present on the porous polymer substrate may be, preferably, 0.001 μm to 50 μm, and porosity may be 1% to 99%, preferably.

Further, a porous coating layer may be additionally included on at least one surface of the porous polymer substrate described above as the separator that can be applied to the present disclosure, and the porous coating layer may include inorganic particles and binder.

The inorganic particles are filled, and in a state of being in contact with each other, the inorganic particles are bound to each other by the binder polymers, generating interstitial volume between the inorganic particles. Such interstitial volume formed between the inorganic particles become voids to form pores.

That is, the binder polymers may adhere the inorganic particles to each other so as to keep the binding between inorganic particles. For example, the binder polymers connect and fix among the inorganic particles. Further, the pores of the porous coating layer are those that are formed as the interstitial volume between the inorganic particles form voids, and these are the spaces that are defined by the inorganic particles substantially in a surface-contact in a closed packed or densely packed structure of the inorganic particles. Through these pores of the porous coating layer, a path is formed to allow the lithium ions, the essential elements for the operation of the battery, to move.

The inorganic particles may not be specifically limited as long as they are stable electrochemically. That is, the inorganic particles that can be used in the present disclosure may not be specifically limited as long as oxidation and/or reduction does not occur at operating voltage range (e.g., 0 V to 5 V based on Li/Li$^+$) of an electrochemical device in use. Specifically, when the inorganic particles having high dielectric constant are used, ion conductivity of electrolyte can be improved as the inorganic particles contribute to increased dissociation of electrolyte salt (e.g., lithium salt) within liquid electrolyte.

Because of the above reasons, the inorganic particles may include high dielectric constant inorganic particles having a dielectric constant of 5 or higher, or preferably, 10 or higher, or inorganic particles having lithium ion transfer ability, or a mixture thereof.

The non-limiting example of the inorganic particles having a dielectric constant of 5 or higher may include one selected from a group consisting of $BaTiO_3$, $Pb(Zr_xTi_{1-x})O_3$ (PZT, 0<x<1), $Pb_{1-x}La_xZr_{1-y}TiO_3$ (PLZT, 0<x<1, 0<y<1), $(1-x)Pb(Mg_{1/3}Nb_{2/3})O_3$-$xPbTiO_3$ (PMN-PT, 0<x<1), $HfO_2$, $SrTiO_3$, $SnO_2$, $CeO_2$, $MgO$, $NiO$, $CaO$, $ZnO$, $ZrO_2$, $SiO_2$, $Y_2O_3$, $Al_2O_3$, $SiC$ and $TiO_2$ or a mixture of two or more of the above, and such inorganic particles may exhibit not only the high dielectric constant characteristic of dielectric constant of 100 or higher, but also the piezoelectricity in which electrical potential is generated between both surfaces by the electrical charges generated by certain pressure that is exerted for providing tension or compression. Accordingly, internal short circuit between both electrodes due to external impact can be prevented, and stability of the electrochemical device can be enhanced.

Further, the 'inorganic particles having lithium ion transfer ability' herein refers to inorganic particles that contain lithium atoms, but that has a function of moving lithium ions without storing the same. The non-limiting example of the inorganic particles having lithium ion transfer ability may include lithium phosphate ($Li_3PO_4$), lithium titanium phosphate ($Li_xTi_y(PO_4)_3$, (0<x<2, 0<y<3)), lithium aluminum titanium phosphate ($Li_xAl_yTi_z(PO_4)_3$ ($0<x<2, 0<y<1, 0<z<3$)), ($LiAlTiP)_xO_y$-based glass ($0<x<4, 0<y<13$), lithium lanthanum titanate ($Li_xLa_yTiO_3$, ($0<x<2, 0<y<3$)), lithium germanium thiophosphate ($Li_xGe_yP_zS_w$, ($0<x<4, 0<y<1, 0<z<1, 0<w<5$)), lithium nitride ($Li_xN_y$, ($0<x<4, 0<y<2$)), $SiS_2$ ($Li_xSi_yS_z$, $0<x<3, 0<y<2, 0<z<4$)-based glass, and $P_2S_5$ ($Li_xP_yS_z$, $0<x<3, 0<y<3, 0<z<7$)-based glass, or a mixture thereof. When the high dielectric constant inorganic particles and the inorganic particles having the lithium ion transfer ability described above are mixed and used together, the synergistic effect thereof can multiply.

A size of the inorganic particles of the porous coating layer may not be limited, although it may possibly be from 0.001 μm to 10 μm, preferably, for a regular thickness and proper porosity of the coating layer.

For the polymer binder forming the porous coating layer, any binder that can be used in formation of the porous coating layer with the inorganic particles may be used without limitation, but it is preferable to use organic binder polymers or aqueous binder polymers.

The porous heat transfer film may be formed on one surface or both surfaces of the separator.

In an example, as described above, when the separator is formed of the porous polymer substrate and the porous coating layer, the porous heat transfer film may be formed on a surface of the porous coating layer.

Further, the porous heat transfer film that can be used in the present disclosure may be formed of at least one selected from a group consisting of graphite, carbon nano-tube and carbon nano-fabric, and may preferably be formed of graphite.

The porous heat transfer film that can be used in the present disclosure may rapidly diffuse heats generated within the battery cell, and prevent short circuit between the positive electrode and the negative electrode.

Accordingly, the porous heat transfer film should have a greater heat conductivity in a surface direction than that in a thickness direction, which will enable the porous heat transfer film to stop diffusion of heats from within the battery cell to the separator.

Specifically, heat conductivity in a surface direction of the porous heat transfer film may preferably be a 20-fold greater value than that in a thickness direction, in order to increase the heat diffusion efficiency described above.

According to an embodiment of the present disclosure, an interior of the porous heat transfer film of the heat-diffusible separator may be formed of a porous material. Such porous heat transfer film may be formed to have an open cell type structure or a closed cell type structure. In the open cell type structure, the pores in the porous heat transfer sheet are present in a connected form, while in the closed cell type structure, the pores in the porous heat transfer sheet are independently present without being connected.

According to another embodiment, a secondary battery including the heat-diffusible separator described above is provided.

The secondary battery may have a structure in which the positive electrode and the negative electrode are stacked, while having the heat-diffusible separator interposed therebetween.

The positive electrode may use any material that can constitute the battery cell, and preferably, may be composed of an electrode current collector coated with a positive electrode active material.

In an example, the positive electrode active material may be prepared by using active material particles consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are independently any one selected from a group consisting of Al, Ni, Co, Fe, Mn, V, Cr, Ti, W, Ta, Mg and Mo; x, y, and z are independently atom fractions of the atoms composing the oxide; and $0 \le x<0.5, 0 \le y<0.5, 0 \le z<0.5, 0<x+y+z=1$).

Further, the negative electrode may be also composed of any material that can constitute the battery cell, and preferably, may be composed of an electrode current collector coated with a negative electrode active material.

The negative electrode active material may be formed of: carbonaceous material such as natural graphite, artificial graphite, etc.; metal (Me) such as Li-containing titanium complex oxide (LTO), Si, Sn, Li, Zn, Mg, Cd, Ce, Ni or Fe; alloy composed of the metal (Me) described above; oxide (MeOx) of the metal (Me) described above; and active material particles composed of composite of the metal (Me) described above and carbon.

Further, the electrode current collector of the positive electrode or the negative electrode may be formed of: stainless steel, aluminum, nickel, titanium, sintered carbon, and copper; stainless steel surface-treated with carbon, nickel, titanium, or silver; and aluminum-cadmium alloy, and so on.

Hereinafter, for more specific description, the present disclosure will be described in detail with reference to Examples. However, the Examples according to the present disclosure can be modified in various forms, and the scope of the present disclosure is not to be construed as being limited to the Examples described below. The Examples according to the present disclosure are provided in order to give more complete description of the present disclosure to those having average knowledge in the art.

Example 1

A graphite sheet having a thickness of about 20 μm was perforated with a punching machine to form circular pores having a diameter of 1000 μm, with a porosity of 70%.

Polyethylene separator/graphite sheet/positive electrode was adhered by using PVDF-based binder, and adhered to other surface of the separator where the graphite sheet and the positive electrode were not adhered, by using carboxymethyl cellulose (CMC)-based binder. A lithium ion battery cell (27 cm×10 cm×0.5 cm) was prepared with the negative electrode/separator/graphite sheet/positive electrode, and electrolyte containing EC and $LiPF_6$ as main ingredients. Overheating test and nail penetration test were conducted, measuring cell voltage variations according to time and local temperature variations according to time (i.e., at three local points including: center point, and two points spaced apart from the center point by 5 cm).

Example 2

Instead of the graphite sheet used in Example 1, exfoliated graphite was used. The exfoliated graphite was prepared by processing expanded graphite through quick heating and ultrasound treating at high temperature, and the exfoliated graphite having a thickness of about 40 nm was adhered to the polyethylene separator with PVDF-based binder. (The exfoliated graphite and the binder were mixed into solvent, and the mixture was stirred and coated on the separator.) The positive electrode was adhered onto the surface coated with the exfoliated graphite, and the negative electrode was adhered onto the other surface of the separator uncoated with the exfoliated graphite. The lithium ion battery cell (27 cm×10 cm×0.5 cm) was then prepared by using the negative electrode/separator/exfoliated graphite/positive electrode and the electrolyte containing EC and LiPF$_6$ as main ingredients, and underwent overheating test and the nail penetration test as described in Example 1.

Comparative Example 1

A lithium ion battery cell (27 cm×10 cm×0.5 cm) was prepared with the negative electrode/separator/positive electrode and the electrolyte containing EC and LiPF$_6$ as main ingredients, and underwent the overheating test and the nail penetration test as described in the Example 1.

Measurement of Voltage and Local Temperature Variations in Overheating Test/Nail Penetration Test The lithium ion battery cell of Comparative Example 1 had faster decrease of the cell voltage, greater temperature deviations across locations, and faster temperature rise when compared with Examples 1 and 2, while Examples 1 and 2 had low temperature deviations as the graphite sheet and the exfoliated graphite rapidly diffused heats generated locally within the battery cell in the surface direction.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A heat-diffusible separator, comprising:
   a porous polymer substrate;
   a porous coating layer disposed on at least one surface of the porous polymer substrate, wherein the porous coating layer comprises inorganic particles and a binder polymer; and
   a porous heat transfer film disposed on a surface of the porous coating layer,
   wherein the porous heat transfer film has a greater value of heat conductivity in a surface direction than that of heat conductivity in a thickness direction.

2. The heat-diffusible separator of claim 1, wherein heat conductivity of the porous heat transfer film in a surface direction is 20 times greater than heat conductivity in a thickness direction.

3. The heat-diffusible separator of claim 1, wherein the pores of the porous heat transfer film are connected with each other.

4. The heat-diffusible separator of claim 1, wherein the pores of the porous heat transfer film are not connected to each other.

5. The heat-diffusible separator of claim 1, wherein the porous heat transfer film comprises at least one selected from a group consisting of graphite, carbon nano-tube and carbon nano-fabric.

6. The heat-diffusible separator of claim 1, wherein the inorganic particles having a size ranging from 0.001 μm to 10 μm.

7. The heat-diffusible separator of claim 1, wherein the pores of the porous coating layer are interstitial volumes formed between the inorganic particles.

8. The heat-diffusible separator of claim 1, wherein the porous heat transfer film is a perforated graphite sheet.

9. The heat-diffusible separator of claim 1, wherein the inorganic particles have a dielectric constant of 5 or higher, or have lithium ion transfer ability.

10. The heat-diffusible separator of claim 1, wherein a size ratio between pores of the porous polymer substrate and pores of the porous heat transfer film range from 0.005:1 to 0.05:1.

11. The heat-diffusible separator of claim 1, wherein the porous heat transfer film comprises exfoliated graphite and a PVDF-based binder.

12. A secondary battery comprising the heat-diffusible separator according to claim 1.

* * * * *